United States Patent [19]
Cheng

[11] Patent Number: 6,164,407
[45] Date of Patent: *Dec. 26, 2000

[54] ELECTRIC POWER STEERING APPARATUS

[75] Inventor: Wangquan (Winston) Cheng, Troy, Mich.

[73] Assignee: TRW Inc., Lyndhurst, Ohio

[ * ] Notice: This patent is subject to a terminal disclaimer.

[21] Appl. No.: 09/206,047

[22] Filed: Dec. 4, 1998

[51] Int. Cl.$^7$ ........................................... B62D 5/04
[52] U.S. Cl. .............. 180/444; 74/409; 74/396; 74/89.13; 74/89.15; 74/499; 180/443
[58] Field of Search .................... 180/444, 431, 180/400, 443, 446, 79.1; 74/409, 396

[56] References Cited

U.S. PATENT DOCUMENTS

| | | | |
|---|---|---|---|
| 4,694,925 | 9/1987 | Roberts | 180/79.1 |
| 4,724,714 | 2/1988 | Iwasaki et al. | 74/396 |
| 4,784,234 | 11/1988 | Naito et al. | 180/79.1 |
| 4,865,145 | 9/1989 | Ijiri et al. | 180/79.1 |
| 4,979,404 | 12/1990 | Nakata et al. | 74/409 |
| 4,987,963 | 1/1991 | Oslapas et al. | 180/79.1 |
| 5,078,225 | 1/1992 | Ohmura et al. | 180/133 |
| 5,165,495 | 11/1992 | Fujii | 180/79.1 |
| 5,213,173 | 5/1993 | Konishi et al. | 180/79.1 |
| 5,445,237 | 8/1995 | Eda et al. | 180/79.1 |
| 5,456,330 | 10/1995 | Kojima et al. | 180/79.1 |
| 5,743,145 | 4/1998 | Terada et al. | 74/409 |
| 5,899,294 | 5/1999 | Shimizu et al. | 180/444 |
| 5,921,344 | 7/1999 | Boyer | 180/444 |
| 5,992,558 | 11/1999 | Noro et al. | 180/446 |
| 6,000,491 | 12/1999 | Shimizu et al. | 180/444 |

FOREIGN PATENT DOCUMENTS

| | | |
|---|---|---|
| 0376457 | 7/1990 | European Pat. Off. . |
| 0659628 | 6/1995 | European Pat. Off. . |
| 0860346 | 8/1998 | European Pat. Off. . |
| 07237551 | 9/1995 | Japan . |
| 7-237551 | 12/1995 | Japan . |
| 08028669 | 2/1996 | Japan . |
| 10-297505 | 10/1998 | Japan . |
| 9802343 | 1/1998 | WIPO . |

OTHER PUBLICATIONS

*Handbook of Mechanical Power Drives*, 3$^{rd}$ Edition, pp. 410, 411 XP–002132751.

*Primary Examiner*—J. J. Swann
*Assistant Examiner*—J. Allen Shriver
*Attorney, Agent, or Firm*—Tarolli, Sundheim, Covell, Tummino & Szabo L.L.P.

[57] ABSTRACT

A vehicle steering apparatus (10) for turning steerable wheels (44) of a vehicle comprises a manually rotatable input member (12) to which steering torque is applied, an output member (34) rotatable to effect turning of the steerable wheels (44) of the vehicle, and an electric motor (102) for providing a drive force to rotate the output member (34) as a function of the steering torque applied to the input member (12). The electric motor (102) includes a motor shaft (100) having an axis of rotation (104). First and second meshing gears (54 and 56) transmit the drive force of the electric motor (102) to the output member (34). The first gear (54) is rotatable with the output member (34) and the second gear (56) is rotatable with the motor shaft (100). An adjusting mechanism (86, 122) adjusts backlash between the first and second gears (54 and 56). The adjusting mechanism (86, 122) includes a mounting mechanism (70, 108) for adjustably mounting the electric motor (102) and the second gear (56) relative to the first gear (54). The mounting mechanism (70, 108) includes eccentric surfaces (80, 120) for shifting the axis of rotation (104) of the motor shaft (100) and the second gear (56) relative to the first gear (54).

11 Claims, 5 Drawing Sheets

ELECTRIC POWER STEERING APPARATUS

TECHNICAL FIELD

The present invention relates to a vehicle steering apparatus, and particularly relates to an electric power steering apparatus for turning steerable wheels of a vehicle.

BACKGROUND OF THE INVENTION

A known electric power steering apparatus for turning steerable wheels of a vehicle includes an input member to which steering torque is applied, a steering torque sensor operatively coupled with the input member, an electronic control unit, and an electric motor. The electronic control unit receives signals from the torque sensor, and possibly other sensors, and controls the electric motor.

The electric motor has a motor shaft which rotates about a motor axis. The motor shaft is connected with a gearbox which provides a gear reduction between the motor shaft of the electric motor and an output pinion meshed with a linearly movable rack. Rotation of the output pinion causes the rack to move linearly to turn the steerable wheels.

The gearbox typically includes a pair of meshed gears, such as a worm gear set. Some amount of backlash may be present between the pair of gears, whatever the configuration of the gears, in the gearbox. The backlash, or amount by which the width of a tooth space exceeds the thickness of an engaging tooth measured on the pitch circle, results primarily from manufacturing tolerances. Excessive backlash can generate undesirable noise and cause the gears to wear. It is desirable for an electric power steering apparatus to include a means for adjusting backlash of the gears in the gearbox between the electric motor and the output pinion.

SUMMARY OF THE INVENTION

The present invention is a vehicle steering apparatus for turning steerable wheels of a vehicle. The apparatus comprises a manually rotatable input member to which steering torque is applied, an output member rotatable to effect turning of the steerable wheels of the vehicle, and an electric motor for providing a drive force to rotate the output member as a function of the steering torque applied to the input member. The electric motor includes a motor shaft having an axis of rotation. First and second meshing gears transmit the drive force of the electric motor to the output member. The first gear is rotatable with the output member and the second gear is rotatable with the motor shaft about the axis of rotation. Adjusting means is provided for adjusting backlash between the first and second gears. The adjusting means includes mounting means for adjustably mounting the electric motor and the second gear relative to the first gear. The mounting means includes eccentric surface means for shifting the axis of rotation of the motor shaft and the second gear relative to the first gear.

The mounting means includes an annular projection extending axially from a first end of the electric motor. The annular projection has a cylindrical outer surface comprising a first eccentric surface. The first eccentric surface is centered on an eccentric axis which extends parallel to but radially offset from the axis rotation of the motor shaft.

The vehicle steering apparatus further comprises a gearbox housing containing the first and second gears. The electric motor is adjustably mounted to the gearbox housing. The gearbox housing includes a second eccentric surface defining an opening for receiving the annular projection. The backlash between the first and second gears is adjusted by manually rotating the electric motor relative to the gearbox housing about the eccentric axis.

In accordance with a preferred embodiment of the present invention, the first and second gears comprise a spiroid gear set.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENT

Figure 1:
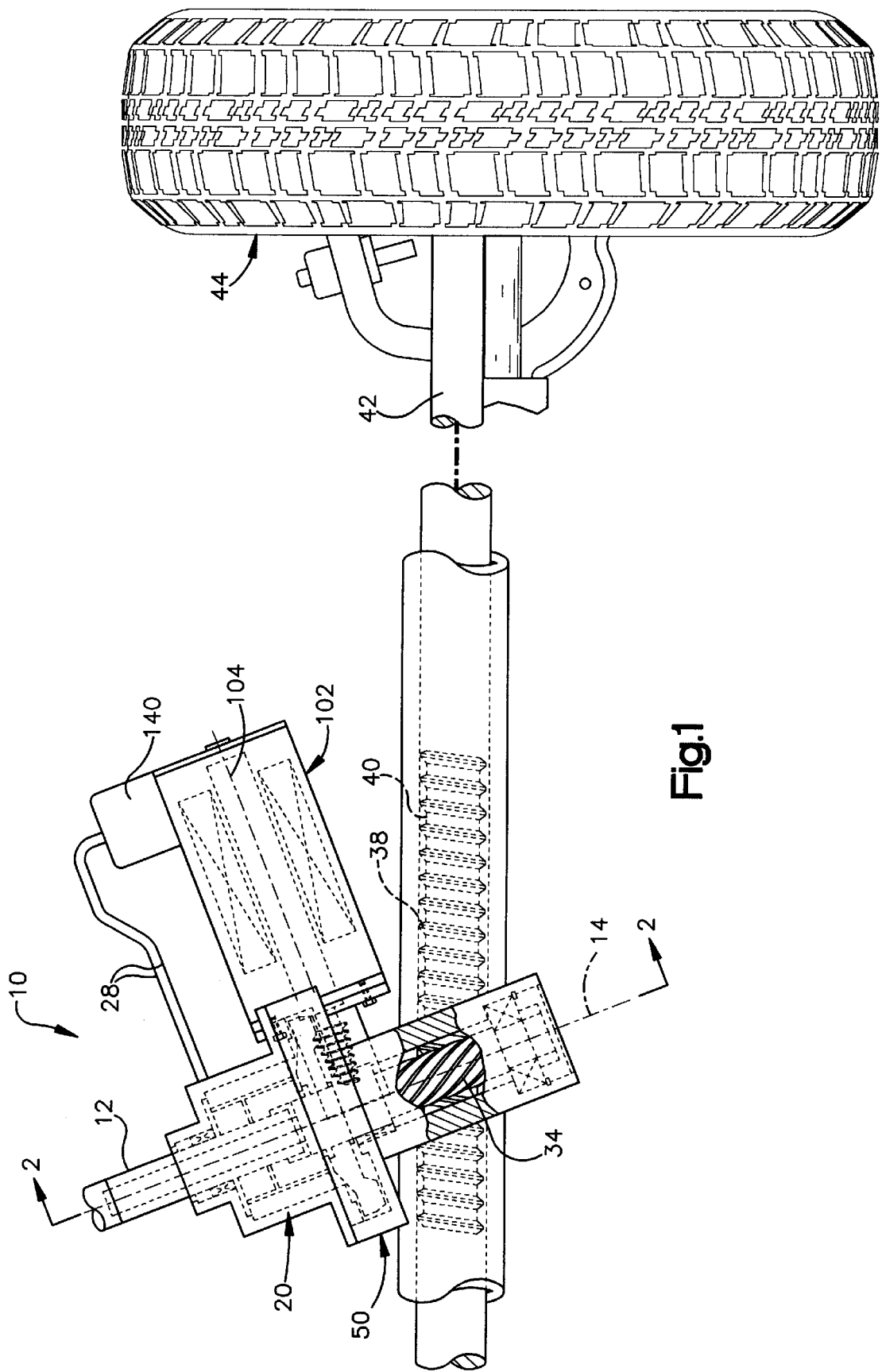
FIG. 1 is a schematic view of a vehicle power steering apparatus constructed in accordance with the present invention.

The present invention relates to a vehicle steering apparatus, and particularly relates to an electric power steering apparatus for turning steerable wheels of a vehicle. As representative of the present invention, FIG. 1 illustrates a power steering apparatus 10 for a vehicle, such as an automobile.

Figure 2:
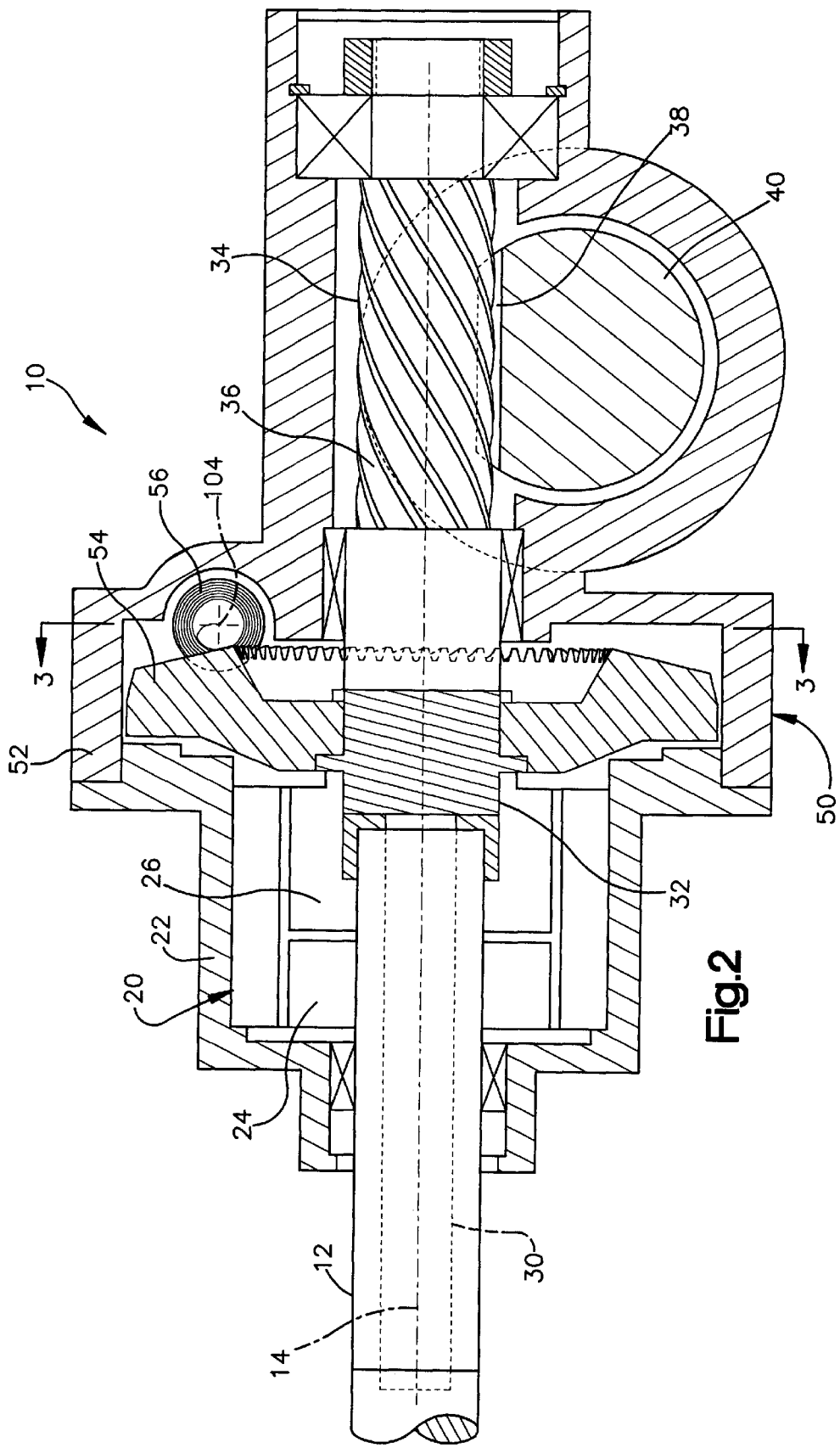
FIG. 2 is a sectional view taken along line 2—2 in FIG. 1.

The steering system 10 includes a vehicle steering wheel (not shown) and a rotatable input shaft 12 which is operatively coupled, in a manner not shown, for rotation with the vehicle steering wheel about an axis 14. A torque sensor 20 encircles the input shaft 12. The torque sensor 20 includes a sensor housing 22 (FIG. 2) and a pair of relatively movable members 24 and 26, respectively. The movable members 24, 26 of the torque sensor 20 have coils (not shown) which respond to relative rotation of the movable members and output an electrical signal over electrical lines 28 (FIG. 1) indicative of the direction and magnitude of the applied steering torque.

A torsion bar 30 (FIG. 2) connects the input shaft 12 to an output shaft 32. The torsion bar 30 twists in response to steering torque applied to the steering wheel. When the torsion bar 30 twists, relative rotation occurs between the input shaft 12 and the output shaft 32.

The output shaft 32 extends through a drive reduction unit or gearbox 50. The output shaft 32 is supported for rotation by the gearbox 50 about the axis 14. A portion of the output shaft 32 is formed as a pinion gear 34 having external gear teeth 36. The gear teeth 36 on the pinion gear 34 are in meshing engagement with a series of rack teeth 38 on a linearly movable rack 40. The rack 40 (FIG. 1) has end portions 42 (only one of which is shown) coupled to steerable wheels 44 (only one of which is shown) in a known manner. Linear movement of the rack 40 results in steering movement of the steerable wheels 44 of the vehicle.

Figure 3:
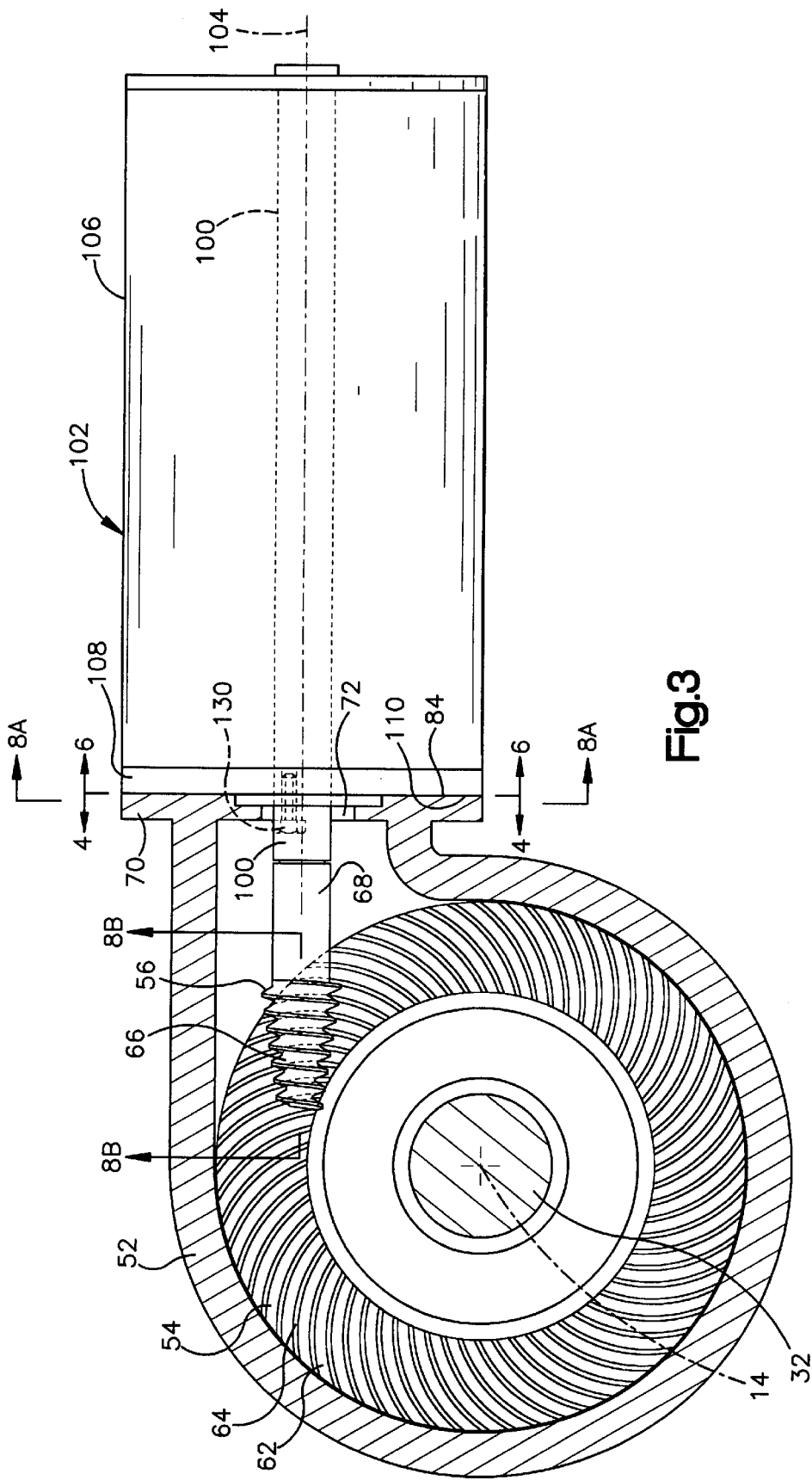
FIG. 3 is a view, partially in section, taken along line 3—3 in FIG. 2.
Figure 3A:
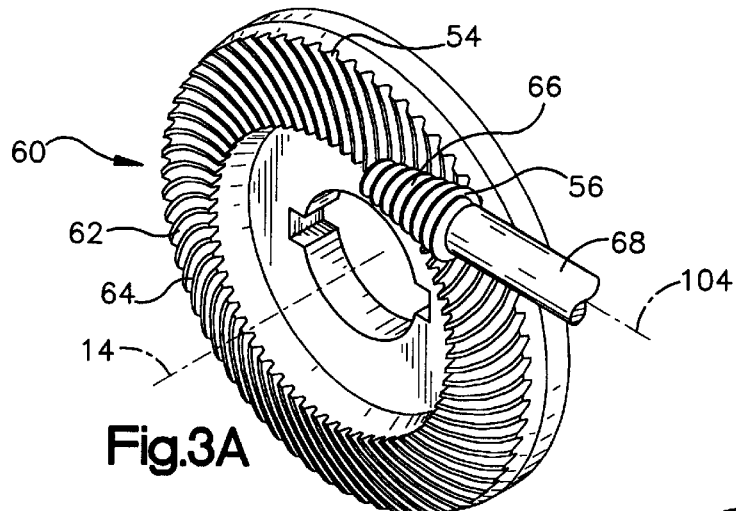
FIG. 3A is a perspective view of components of the vehicle power steering apparatus shown in FIG. 3.

The gearbox 50 includes a gearbox housing 52 containing first and second meshing gears 54 and 56, respectively. The first gear 54 is keyed to the output shaft 32 for rotation with the output shaft about the axis 14. The second gear 56 is connected for rotation with a motor shaft 100 (FIG. 3) of an electric motor 102 about a non-intersecting, transversely extending axis 104. In accordance with a preferred embodiment of the invention, the first and second gears 54, 56 comprise a spiroid gear set 60 (FIGS. 3 and 3A). The first gear 54 in the spiroid gear set 60 is a face gear 62 and has teeth 64 which are curved in a lengthwise direction. The second gear 56 is a tapered pinion gear 66 that somewhat resembles a traditional worm gear. The second gear 56 has a shaft portion 68 extending away from the first gear 54.

Figure 4:
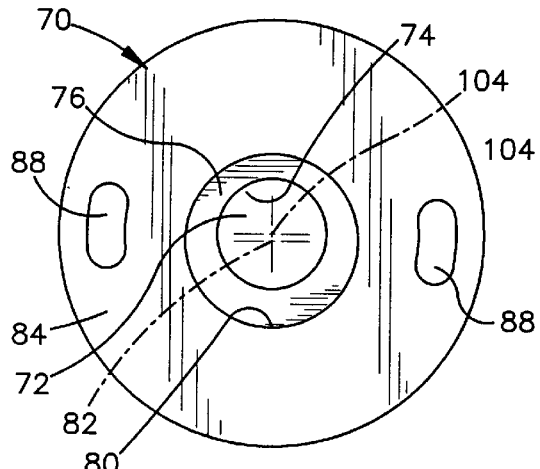
FIG. 4 is a view taken along line 4—4 in FIG. 3 with parts omitted for clarity.
Figure 5:
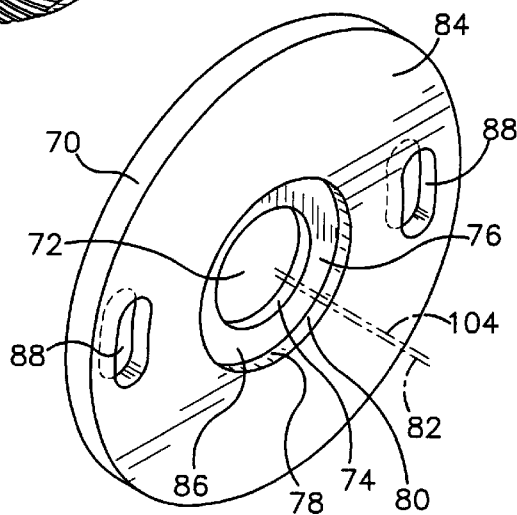
FIG. 5 is a perspective view of the portion of the vehicle power steering apparatus shown in FIG. 4.

The gearbox housing 52 includes a mounting flange 70 oriented perpendicular to the axis 14. The mounting flange 70 has a first opening 72 defined by a cylindrical inner surface 74 (FIGS. 4 and 5). The first opening 72 is centered on the transverse axis 104 and is larger in diameter than the shaft portion 68 of the second gear 56. A radially extending surface 76 connects the first opening 72 to a second opening 78 in the mounting flange 70. The second opening 78 is defined by a cylindrical inner surface 80 which is not centered on the transverse axis 104 but is instead centered on an eccentric axis 82. The cylindrical inner surface 80 intersects a radially extending mounting surface 84 of the mounting flange 70 and defines an eccentric depression 86 in the mounting flange. The mounting flange 70 further includes a pair of diametrically opposed slots 88.

Figure 6:
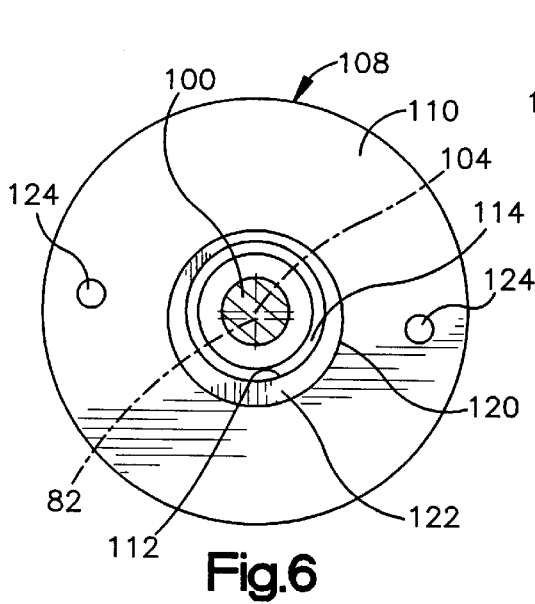
FIG. 6 is a view taken along line 6—6 in FIG. 3.
Figure 7:
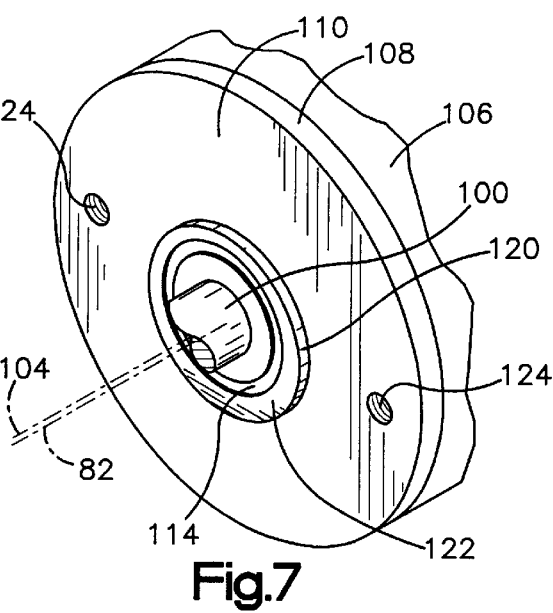
FIG. 7 is a perspective view of the portion of the vehicle power steering apparatus shown in FIG. 6.

The electric motor 102 is a known type for use in an electric assist steering system. The electric motor 102 has a motor housing 106 (FIG. 3) which is generally cylindrical in shape. A mounting plate 108 is secured to one end of the motor housing 106. The mounting plate 108 has a radially extending mounting surface 110 (FIGS. 6 and 7) and a cylindrical inner surface 112 centered on the transverse axis 104. A bearing assembly 114 is press fit into an opening (not numbered) defined by the cylindrical inner surface 112 and supports the motor shaft 100 for rotation about the transverse axis 104.

The mounting plate 108 of the electric motor 102 further includes a cylindrical outer surface 120 extending axially from the mounting surface 110. The cylindrical outer surface 120 is centered on the eccentric axis 82 and defines an eccentric projection 122. The eccentric projection 122 is slightly smaller in diameter than the eccentric depression 86 in the mounting flange 70 of the gearbox housing 52. The mounting plate 108 further includes a pair of diametrically opposed tapped holes 124.

The eccentric projection 122 on the mounting surface 110 of the electric motor 102 is received in the eccentric depression 86 (see FIG. 3). The radially extending surfaces 84 and 110 on the mounting flange 70 and the mounting plate 108, respectively, abut one another. The slots 88 in the mounting flange 70 overlie the tapped holes 124 in the mounting plate 108. A screw 130 extends through each of the slots 88 and is received in a respective one of the tapped holes 124 to secure the electric motor 102 to the mounting flange 70 of the gearbox housing 52.

The steering system 10 further includes an electronic control unit or controller 140 (FIG. 1). The controller 140 is preferably secured to the electric motor 102 in a manner not shown and operatively coupled to the electric motor. The controller 140 is electrically connected by the electrical lines 28 to the torque sensor 20. The controller is operable to receive electrical signals from the torque sensor 20 and to control the electric motor 102 in accordance with the received electrical signals.

When steering torque is applied to the vehicle steering wheel, the input shaft 12 rotates about the axis 14. The direction and magnitude of the applied steering torque are sensed by the torque sensor 20. The torque sensor outputs an electrical signal to the controller 140. The electric motor 102 is energized by a control signal transmitted to the electric motor by the controller 140, and the motor shaft 100 of the electric motor is caused to rotate about the transverse axis 104.

The rotating motor shaft 100 applies a drive force to the second (pinion) gear 56. The second gear 56, which is meshed with the teeth 64 on the first (face) gear 54, effects rotation of the first gear and the pinion gear 34 about the axis 14 at a reduced speed compared to the rotational speed of the electric motor 102. The first and second gears 54, 56 in the gearbox 50 thus transmit the drive force of the electric motor 102 to the pinion gear 34.

The rotation of the pinion gear 34 results in linear movement of the rack 40. The rack 40 moves in a direction consistent with the applied steering torque and thereby moves the steerable wheels 44 of the vehicle. The electric motor 102 thus provides steering assist in response to the applied steering torque.

Figure 8A:
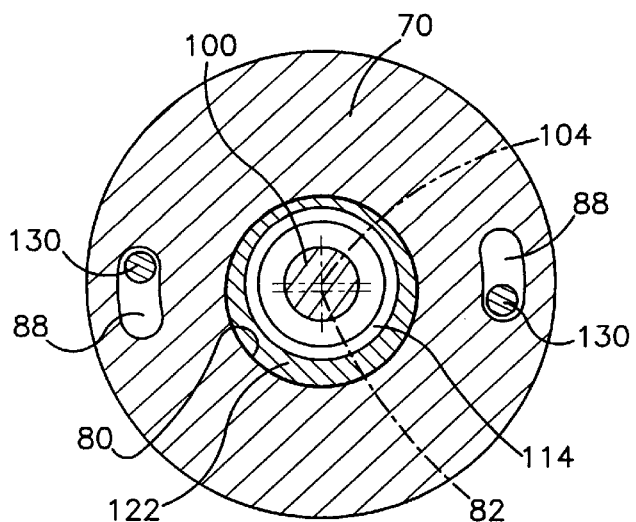
FIG. 8A is a view taken along line 8A—8A in FIG. 3 showing parts of the vehicle power steering apparatus in a first position.
Figure 8B:
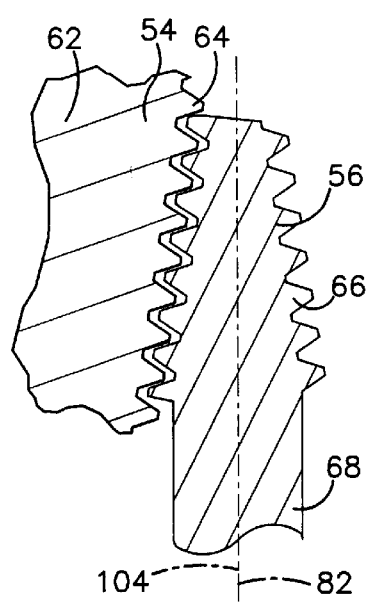
FIG. 8B is a view taken along line 8B—8B in FIG. 3 further illustrating parts of the vehicle power steering apparatus in the first position.
Figure 9A:
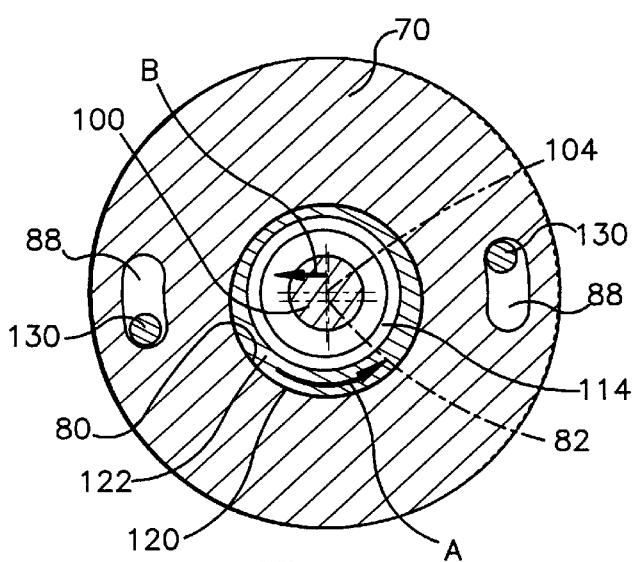
FIG. 9A is a view similar to FIG. 8A showing parts of the vehicle power steering apparatus in a second position.
Figure 9B:
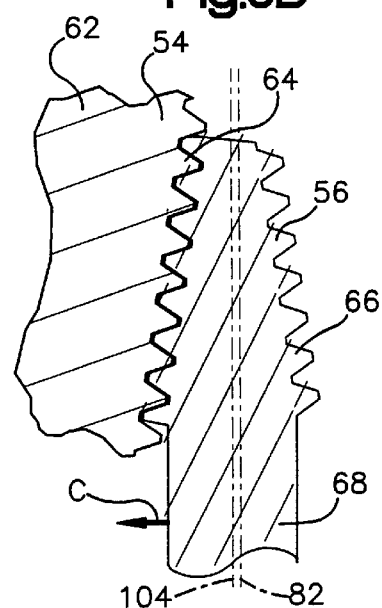
FIG. 9B is a view similar to FIG. 8B further illustrating parts of the vehicle power steering apparatus in the second position.

The eccentric surfaces 80 and 120 on the gearbox housing 70 and electric motor 102, respectively, provide the steering system 10 with a means for adjusting backlash in the gears 54, 56 between the electric motor 102 and the pinion gear 34. FIGS. 8A and 8B show the relative position of the first and second gears 54 and 56 in a first condition where backlash requires adjustment. To adjust the backlash, the screws 130 are loosened and the electric motor 102 is manually rotated about the eccentric axis 82 in the direction of arrow A in FIG. 9A. This manual rotation of the electric motor 102 slides the eccentric surface 120 of the projection 122 along the eccentric surface 80 of the depression 86 in the gearbox housing 50 and causes the transverse axis 104 of the electric motor shaft 100 to shift in the direction of arrow B in FIG. 9A. As shown in FIG. 9B, this shifting of the transverse axis 104 about which the motor shaft 100 rotates moves the second gear 56 toward the first gear 54 in the direction of arrow C and into a second condition for the first and second gears 54 and 56 where the backlash has been adjusted. The first and second conditions shown in FIGS. 8B and 9B are intended to be of a representative nature only. It should be understood that numerous relative positions of the first and second gears 54 and 56 are possible.

The present invention thus provides a steering system 10 in which the backlash between the gears 54, 56 is easily manually adjusted. Backlash adjustments can thus be made upon assembly of the steering system 10 by the part manufacturer, the vehicle manufacturer, or by a mechanic at a later time as required.

The present invention further provides a steering system 10 which utilizes a spiroid gear set 60. The spiroid gear set 60 allows for a high gear ratio to be used in a compact arrangement. Further, the spiroid gear set 60 is relatively low in cost when mass produced and offers good load-carrying capacity.

Figure 10:
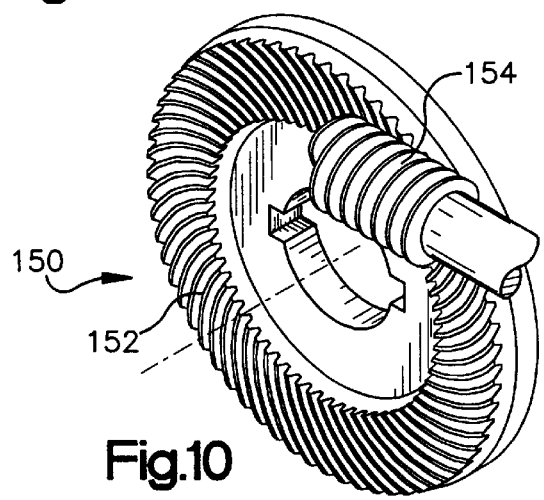
FIG. 10 is a view similar to FIG. 3A showing an alternate embodiment of the present invention.

FIG. 10 illustrates an alternate gear set 150 for the present invention. The gear set shown in FIG. 10 includes a face gear 152 and a cylindrical pinion gear 154. The face gear 152 and cylindrical pinion gear 154 function similar to the spiroid gear set 60 described in the previous embodiment to transmit the drive force of the electric motor 102 to the pinion gear 34 at a reduced speed. The backlash in the gears 152, 154 is adjustable using the eccentric surfaces 80, 120 and manual rotation of the electric motor 102 as described above.

From the above description of the invention, those skilled in the art will perceive improvements, changes and modifications. Such improvements, changes and modifications within the skill of the art are intended to be covered by the appended claims.

Having described the invention, I claim:

1. A vehicle steering apparatus for turning steerable wheels of a vehicle, said apparatus comprising:

a manually rotatable input member to which steering torque is applied;

an output member rotatable to effect turning of the steerable wheels of the vehicle;

an electric motor for providing a drive force to rotate said output member as a function of the steering torque applied to said input member, said electric motor including a motor shaft having an axis of rotation;

first and second meshing gears for transmitting the drive force of said electric motor to said output member, said first gear being rotatable with said output member and said second gear being rotatable with said motor shaft about said axis of rotation; and adjusting means for adjusting backlash between said first and second gears, said adjusting means including mounting means for adjustably mounting said electric motor and said second gear relative to said first gear, said mounting means including eccentric surface means for shifting said axis of rotation of said motor shaft and said second gear relative to said first gear.

2. The vehicle steering apparatus of claim 1 wherein said mounting means includes an annular projection extending axially from a first end of said electric motor.

3. The vehicle steering apparatus of claim 2 wherein said annular projection has a cylindrical outer surface comprising a first eccentric surface, said first eccentric surface being centered on an eccentric axis which extends parallel to but radially offset from said axis of rotation of said motor shaft.

4. The vehicle steering apparatus of claim 3 further comprising a gearbox housing containing said first and second gears, said electric motor being adjustably mounted to said gearbox housing.

5. The vehicle steering apparatus of claim 4 wherein said gearbox housing includes a second eccentric surface defining an opening for receiving said annular projection.

6. The vehicle steering apparatus of claim 5 wherein the backlash between said first and second gears is adjusted by manually rotating said electric motor relative to said gearbox housing about said eccentric axis.

7. The vehicle steering apparatus of claim 1 wherein said first and second gears comprise a spiroid gear set.

8. The vehicle steering apparatus of claim 1 further comprising a torsion bar interconnecting said input member and said output member, said torsion bar permitting relative rotation between said input member and said output member.

9. The vehicle steering apparatus of claim 1 further comprising a torque sensor operatively coupled with said input member, said torque sensor being operable to sense the steering torque applied to said input member and to provide an electrical signal indicative of the applied steering torque.

10. The vehicle steering apparatus of claim 9 further comprising a controller electrically connected to said torque sensor and said electric motor, said controller being operable to receive said electrical signal from said torque sensor and to control said electric motor in accordance with said electrical signal.

11. The vehicle steering apparatus of claim 1 further comprising a rack connected with the steerable wheels of the vehicle, said output member comprising a pinion in meshing engagement with said rack.

* * * * *